United States Patent [19]
Dobbins et al.

[11] Patent Number: 6,038,517
[45] Date of Patent: *Mar. 14, 2000

[54] COMPUTER SYSTEM AND METHOD FOR DYNAMICALLY ASSESSING THE MARKET READINESS OF A PRODUCT UNDER DEVELOPMENT

[75] Inventors: James Gregory Dobbins; Robert G. Biehl, both of Columbia, S.C.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/778,930

[22] Filed: Jan. 3, 1997

[51] Int. Cl.[7] .................................................. G06F 17/60
[52] U.S. Cl. ................................ 702/82; 702/84; 714/38
[58] Field of Search .................................. 702/81, 82, 84; 364/468.16, 468.17; 395/183.14; 705/7, 10; 714/38

[56] References Cited

U.S. PATENT DOCUMENTS

| | | | |
|---|---|---|---|
| 5,041,972 | 8/1991 | Frost | 705/10 |
| 5,059,127 | 10/1991 | Lewis et al. | 434/353 |
| 5,124,911 | 6/1992 | Sack | 705/10 |
| 5,208,765 | 5/1993 | Turnbull | 702/84 |
| 5,223,207 | 6/1993 | Gross et al. | 376/216 |
| 5,715,180 | 2/1998 | Hu | 364/468.16 |
| 5,715,181 | 2/1998 | Horst | 364/468.16 |
| 5,717,607 | 2/1998 | Hu | 364/468.16 |
| 5,761,093 | 6/1998 | Urbish et al. | 702/82 |
| 5,765,137 | 6/1998 | Lee | 364/468.16 |
| 5,774,379 | 6/1998 | Gross et al. | 1/1 |
| 5,787,021 | 7/1998 | Samaha | 364/468.16 |

OTHER PUBLICATIONS

*Software–Reliability–Engineered Testing*, John D. Musa (Software Reliability Engineering and Testing Courses), Nov. 1996, pp. 61–68.

*Primary Examiner*—Eric W. Stamber
*Attorney, Agent, or Firm*—Gates & Cooper

[57] ABSTRACT

A method, system, and program storage device are disclosed for generating with a computer a current confidence level from accumulated runtime and failure data of a product subjected to product reliability testing. The current confidence level may be generated from time to time during testing and prior to verifying the product has met its reliability goal with a sufficient level of confidence to provide a quantified risk assessment of whether the product will ultimately meet this reliability goal. In effect, the preferred embodiments of the invention provide quantitative tools for measuring quality goals. As schedule goals are also quantitative in nature, the decision of whether to release a product in view of scheduling and quality concerns typically becomes more of a data-driven risk assessment decision.

21 Claims, 7 Drawing Sheets

| INPUT MTBF → | 672 | | | | | | | | | | | | |
|---|---|---|---|---|---|---|---|---|---|---|---|---|---|
| DISCRIMINATION R | 2 | | | | | | | | | | | | |
| INPUT CONFIDENC | 0.8 | | | | | | | | | | | | |

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| DATE | # SERVERS | FAILURES | NON-RELIABILITY FAILURES | FAILURES PER SERVER | RELIABILITY FAILURES PER SERVER | RUN TIME | DOWN TIME | CUM. RUN TIME | ACCEPT IF CUM. FAILS LESS THAN | CUM. FAILURES | REJECT IF CUM. FAILS GREATER THAN | FA STATUS | INSTANT CONFIDENCE |
| 7/29/96 | 1 | 0 | 0 | 0 | 0 | 0 | 0 | 0 | -2.00 | 0 | 2.00 | CONTINUE | 0.50 |
| 7/30/96 | 1 | 3 | 1 | 3 | 2 | 18 | 0 | 18 | -1.96 | 2 | 2.04 | CONTINUE | 0.20 |
| 7/31/96 | 1 | 0 | 0 | 0 | 0 | 0 | 0 | 0 | -2.00 | 0 | 2.00 | CONTINUE | 0.50 |
| 8/1/96 | 1 | 4 | 1 | 4 | 3 | 24 | 0 | 24 | -1.95 | 3 | 2.05 | REJECT | 0.11 |
| 8/2/96 | 1 | 0 | 0 | 0 | 0 | 24 | 0 | 0 | -2.00 | 0 | 2.00 | CONTINUE | 0.50 |
| 8/3/96 | 1 | 0 | 0 | 0 | 0 | 24 | 0 | 24 | -1.95 | 0 | 2.05 | CONTINUE | 0.51 |
| 8/4/96 | 1 | 1 | 1 | 1 | 0 | 24 | 0 | 48 | -1.90 | 0 | 2.10 | CONTINUE | 0.52 |
| 8/5/96 | 1 | 0 | 0 | 0 | 0 | 24 | 0 | 72 | -1.85 | 0 | 2.15 | CONTINUE | 0.53 |
| 8/6/96 | 1 | 3 | 0 | 3 | 2 | 24 | 0 | 96 | -1.79 | 2 | 2.21 | CONTINUE | 0.22 |
| 8/7/96 | 1 | 0 | 0 | 0 | 0 | 24 | 0 | 0 | -2.00 | 0 | 2.00 | CONTINUE | 0.50 |
| 8/8/96 | 1 | 0 | 0 | 0 | 0 | 24 | 0 | 24 | -1.95 | 0 | 2.05 | CONTINUE | 0.51 |
| 8/9/96 | 1 | 1 | 0 | 1 | 1 | 24 | 0 | 48 | -1.90 | 1 | 2.10 | CONTINUE | 0.35 |
| 8/10/96 | 1 | 0 | 0 | 0 | 0 | 24 | 0 | 72 | -1.85 | 1 | 2.15 | CONTINUE | 0.36 |
| 8/11/96 | 1 | 0 | 0 | 0 | 0 | 24 | 0 | 96 | -1.79 | 1 | 2.21 | CONTINUE | 0.37 |
| 8/12/96 | 4 | 1 | 0 | 0.25 | 0.25 | 96 | 0 | 120 | -1.74 | 1 | 2.26 | CONTINUE | 0.37 |
| 8/13/96 | 4 | 5 | 1 | 1.25 | 1 | 96 | 0 | 216 | -1.54 | 2 | 2.46 | CONTINUE | 0.26 |
| 8/14/96 | 4 | 3 | 0 | 0.75 | 0.75 | 96 | 0 | 0 | -2.00 | 0 | 2.00 | CONTINUE | 0.50 |
| 8/15/96 | 4 | 4 | 1 | 1 | 1 | 96 | 0 | 96 | -1.79 | 3 | 2.21 | REJECT | 0.13 |
| 8/16/96 | 4 | 1 | 0 | 0.25 | 0.25 | 96 | 0 | 0 | -2.00 | 0 | 2.00 | CONTINUE | 0.50 |
| 8/17/96 | 4 | 0 | 0 | 0 | 0 | 96 | 0 | 96 | -1.79 | 0 | 2.21 | CONTINUE | 0.54 |
| 8/18/96 | 4 | 0 | 0 | 0 | 0 | 96 | 0 | 192 | -1.59 | 0 | 2.41 | CONTINUE | 0.57 |
| 8/19/96 | 4 | 0 | 0 | 0 | 0 | 96 | 0 | 288 | -1.38 | 0 | 2.62 | CONTINUE | 0.61 |
| 8/20/96 | 5 | 2 | 0 | 0.4 | 0.4 | 120 | 0 | 408 | -1.12 | 2 | 2.88 | CONTINUE | 0.31 |
| 8/21/96 | 5 | 5 | 0 | 1 | 1 | 120 | 0 | 528 | -0.87 | 7 | 3.13 | REJECT | 0.02 |
| 8/22/96 | 5 | 0 | 0 | 0 | 0 | 120 | 0 | 0 | -2.00 | 0 | 2.00 | CONTINUE | 0.50 |
| 8/23/96 | 5 | 1 | 0 | 0.2 | 0.2 | 120 | 0 | 120 | -1.74 | 1 | 2.26 | CONTINUE | 0.37 |
| 8/24/96 | 5 | 1 | 0 | 0.2 | 0.2 | 120 | 0 | 240 | -1.48 | 1 | 2.52 | CONTINUE | 0.42 |
| 8/25/96 | 5 | 1 | 0 | 0.2 | 0.2 | 120 | 0 | 360 | -1.23 | 1 | 2.77 | CONTINUE | 0.46 |
| 8/26/96 | 5 | 1 | 0 | 0.2 | 0.2 | 120 | 0 | 480 | -0.97 | 1 | 3.03 | CONTINUE | 0.51 |
| 8/27/96 | 5 | 1 | 0 | 0.2 | 0.2 | 120 | 0 | 600 | -0.71 | 1 | 3.29 | CONTINUE | 0.55 |
| 8/28/96 | 7 | 1 | 0 | 0.142857143 | 0.142857143 | 168 | 0 | 768 | -0.35 | 2 | 3.65 | CONTINUE | 0.44 |
| 8/29/96 | 8 | 2 | 0 | 0.25 | 0.25 | 192 | 0 | 960 | 0.06 | 2 | 4.06 | CONTINUE | 0.51 |
| 8/30/96 | 8 | 0 | 0 | 0 | 0 | 192 | 0 | 1152 | 0.47 | 2 | 4.47 | CONTINUE | 0.58 |
| 8/31/96 | 8 | 0 | 0 | 0 | 0 | 192 | 0 | 1344 | 0.89 | 2 | 4.89 | CONTINUE | 0.65 |
| 9/1/96 | 8 | 0 | 0 | 0 | 0 | 192 | 0 | 1536 | 1.30 | 2 | 5.30 | CONTINUE | 0.71 |
| 9/2/96 | 8 | 0 | 0 | 0 | 0 | 192 | 0 | 1728 | 1.71 | 2 | 5.71 | CONTINUE | 0.77 |
| 9/3/96 | 8 | 2 | 0 | 0.25 | 0.25 | 192 | 0 | 1920 | 2.12 | 4 | 6.12 | CONTINUE | 0.52 |
| 9/4/96 | 8 | 0 | 0 | 0 | 0 | 192 | 0 | 2112 | 2.53 | 4 | 6.53 | CONTINUE | 0.59 |
| 9/5/96 | 8 | 0 | 0 | 0 | 0 | 192 | 0 | 2304 | 2.95 | 4 | 6.95 | CONTINUE | 0.66 |
| 9/6/96 | 8 | 1 | 0 | 0.125 | 0.125 | 192 | 0 | 2496 | 3.36 | 5 | 7.36 | CONTINUE | 0.56 |
| 9/7/96 | 8 | 0 | 0 | 0 | 0 | 192 | 0 | 2688 | 3.77 | 5 | 7.77 | CONTINUE | 0.63 |
| 9/8/96 | 8 | 0 | 0 | 0 | 0 | 192 | 0 | 2880 | 4.18 | 5 | 8.18 | CONTINUE | 0.69 |
| 9/9/96 | 8 | 0 | 0 | 0 | 0 | 192 | 0 | 3072 | 4.60 | 5 | 8.60 | CONTINUE | 0.75 |
| 9/10/96 | 8 | 0 | 0 | 0 | 0 | 192 | 0 | 3264 | 5.01 | 5 | 9.01 | ACCEPT | 0.80 |

COMPUTER SYSTEM AND METHOD FOR DYNAMICALLY ASSESSING THE MARKET READINESS OF A PRODUCT UNDER DEVELOPMENT

BACKGROUND OF THE INVENTION

1. Field of the Invention

The present invention relates generally to product readiness assessment testing, and in particular, to computer-implemented tools for use in such testing.

2. Description of the Related Art

The development process in any organization typically has the competing concerns of schedule and quality. On the one hand, in many industries such as the computer industry, short product life cycles and frequent advances in technology necessitate short product development cycles under a "first to market" strategy. On the other hand, there is a need to make a product "right the first time", as research shows that on the average external failure costs are often an order of magnitude more expensive than the corresponding internal costs for finding the same problem prior to release of the product.

Various reliability engineering processes and tools have been developed to assist in product reliability testing. For example, histograms, reliability demonstrations, and control charts have been developed to assist in the determination of whether a product under development has been proven to meet a desired reliability goal. For example, for computer software and hardware products, the desired reliability goal may be in units of Mean Time Before Failure (MTBF) or Service Calls/Machine/Year (SC/M/Y). Standard tests and demonstration methods for these products are still based on Military Standards developed during the World War II era.

One particularly useful test that has been developed is the sequential probability ratio test (SPRT), which may be used to determine when sufficient reliability testing has been performed to prove with a desired level of confidence that a product has met a reliability goal.

With the SPRT, data is typically accumulated manually during product testing relating to the number of failures of the product and the cumulative runtime of a product during testing. In addition, accept and reject lines are manually calculated based upon a desired reliability goal, a desired confidence level that the goal has been met, and a discrimination ratio that is related to the power of the test to detect various levels of reliability (e.g., a test with discrimination ratio of 2 is designed to accept product with MTBF=M and reject product with MTBF=M/2 with high probability). The accept and reject lines provide instantaneous values of acceptable and unacceptable numbers of failures for any given amount of runtime.

As product reliability testing is performed, the accumulated number of failures and runtimes are typically plotted and compared against the accept and reject lines. When the cumulative failures after a given runtime are between the accept and reject lines, additional testing is required. If the cumulative failures cross above the reject line (and into a "reject range"), the product reliability test for the product has failed, indicating that additional engineering, diagnosis, and/or risk assessment may need to be performed, with the test re-run at a later date.

However, if the cumulative number of failures crosses below the accept line after a given runtime (and into an "accept range"), the SPRT indicates that the desired reliability goal has been met with the desired level of confidence. Accordingly, at this point the product testing may be completed and the product released, e.g., to the customer, or to the next stage of development.

One advantage of the SPRT is that the relative performance of a product compared to the desired performance goals may be monitored over time to see how the product test is progressing. Thus, maintaining the cumulative failures between the accept and reject lines often provides the motivation to an organization to continue the product reliability test.

One problem, however, with the SPRT and other reliability testing methods is that often the time required to perform the full tests exceeds the allotted development time for the product. Particularly in the computer industry, the "first to market" goals often require management to release a product before the reliability testing has been completed. Often, management will not even utilize reliability testing methods such as the SPRT due to the expectation that the reliability test would take longer than is available. Often, therefore, management must make uninformed judgment calls as to when to release a product.

A strong need has existed for a manner of assisting management in the determination of when to release a product, particularly prior to completion of product reliability testing. Moreover, a strong need exists for providing a more quantitative assessment of the risks associated with such decisions, so that more objective decision making may occur.

SUMMARY OF THE INVENTION

The present invention principally operates by generating with a computer a current confidence level from accumulated runtime and failure data of a product subjected to product reliability testing. The current confidence level may be generated from time to time during testing and prior to verifying the product has met its reliability goal with a sufficient level of confidence to provide a quantified risk assessment of whether the product will ultimately meet this reliability goal. In effect, the preferred embodiments of the invention provide quantitative tools for measuring quality goals. As schedule goals are also quantitative in nature, the decision of whether to release a product in view of scheduling and quality concerns typically becomes more of a data-driven risk assessment decision.

BRIEF DESCRIPTION OF THE DRAWINGS

Referring now to the Drawings in which like reference numbers represent corresponding parts throughout:

FIG. 7 is an exemplary spreadsheet used in conjunction with the ramp up and stability assessment and product reliability test steps of FIG. 2;

DETAILED DESCRIPTION OF THE PREFERRED EMBODIMENT

In the following description, reference is made to the accompanying Drawings which form a part hereof, and which is shown by way of illustrated embodiments of the invention. It is understood that other embodiments may be utilized and structural changes may be made without departing from the scope of the present invention.

Hardware Environment

Figure 1:
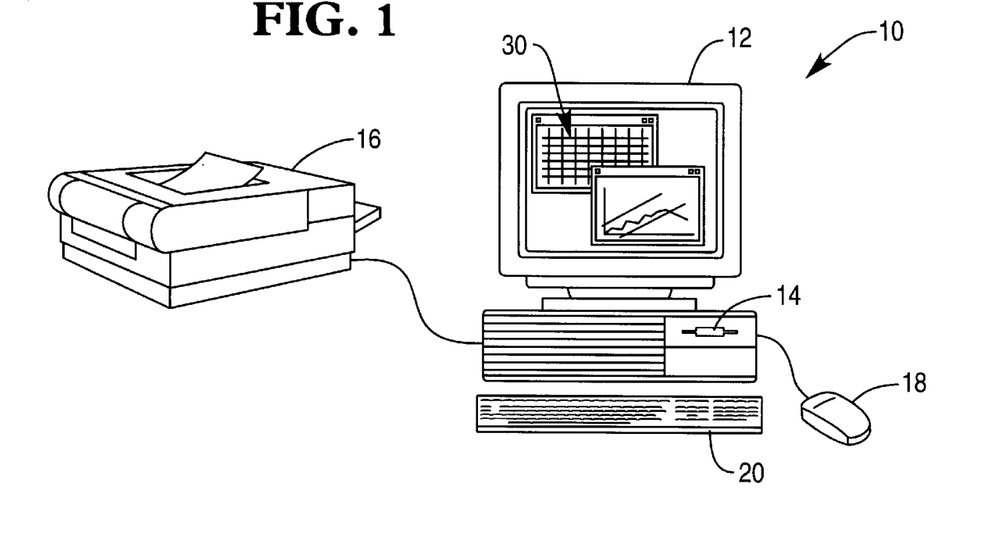
FIG. 1 is a block diagram illustrating an exemplary hardware environment used in product readiness assessment consistent with the invention.

FIG. 1 is an exemplary hardware environment embodiment used in conjunction with a product readiness assessment methodology consistent with the invention. The hardware environment is typically a personal computer 10. It is envisioned that attached to the personal computer 10 may be a monitor 12 (e.g., a CRT, an LCD display or other display device); hard, floppy, and/or CD-ROM disk drives 14; and printer 16 peripherals. Also included in the preferred embodiment may be input devices, for example, a mouse pointing device 18 and a keyboard 20.

Generally, the computer programs which are utilized in the preferred embodiment of the invention are tangibly embodied in a computer-readable medium, e.g., one or more of the fixed and/or removable data storage data devices 14. Under control of the computer, the computer programs may be loaded from the data storage devices 14 into the memory of computer 10. The computer programs comprise instructions which, when read and executed by computer 10, cause computer 10 to perform the steps necessary to execute many of the computer-implemented steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Product Readiness Assessment

In one aspect, the present invention principally operates by providing from time to time an update of the progress toward a desired reliability goal, thereby enabling an organization's management to know a current confidence level even if a reliability test is prematurely stopped at a given time. Practically any product which may be subjected to a product reliability test may be tested consistent with the invention. However, for the purposes of illustration, the test of a computer software product will be described. The invention, however, should not be limited to this particular exemplary embodiment.

An important aspect of the invention is that developers testing products have the ability to note any stage with what confidence a product is meeting its desired goal. As a result, an organization may decide to release a product—that is, pass the product to the next stage of development or release it to a customer—prior to completion of the full product reliability test.

Figure 2:
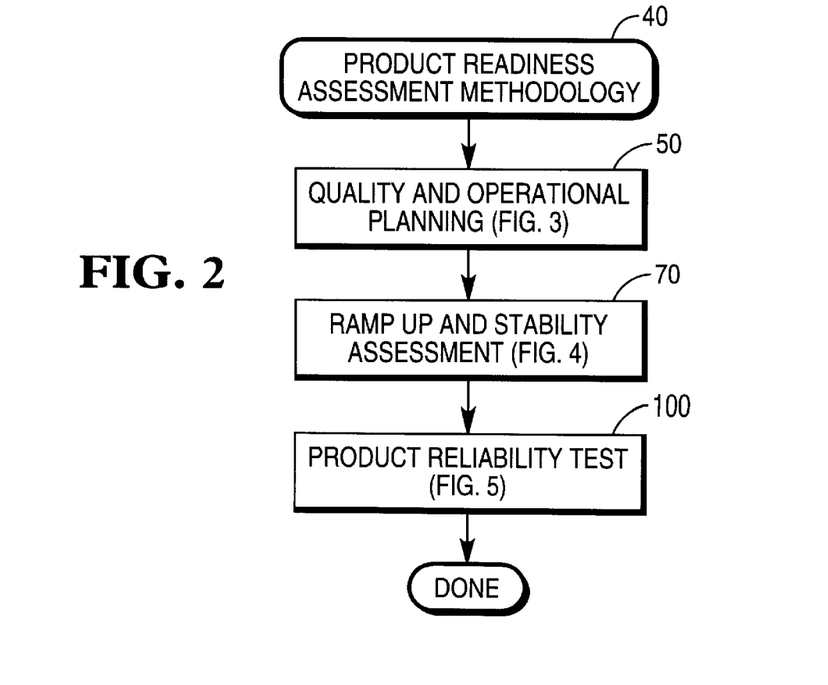
FIG. 2 is a flow chart illustrating a product readiness assessment methodology consistent with the principles of the present invention.

For example, a preferred product readiness assessment methodology 40 is illustrated in FIG. 2. This methodology generally includes a product reliability test 100 which is optionally preceded by one or both of a pair of preliminary steps, namely a quality and operational planning step 50 and a ramp up and stability assessment step 70.

For the purposes of discussion, the product readiness assessment of a computer network operating system software product will be described, whereby the test includes operating the network operating system on one or more network servers under normal operating circumstances. As the manners in which different products may be subjected to failure varies widely with the type of product being tested, it should be appreciated that the invention should not be limited to the particular illustrative example disclosed herein.

Figure 3:
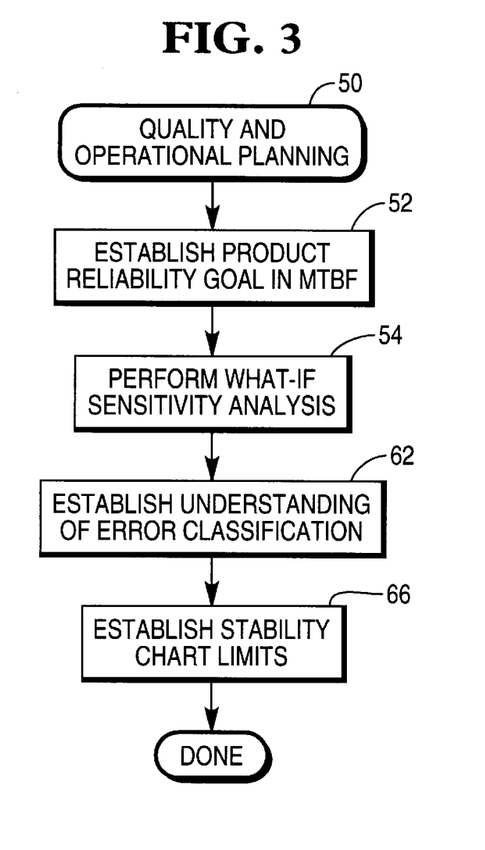
FIG. 3 is a flowchart of the quality and operational planning step of FIG. 2.

The quality and operational planning step 50 is illustrated in greater detail in FIG. 3. In general, it is in this step that the initial parameters are developed for the readiness assessment of a particular product.

First, in block 52, an initial product reliability goal is established, e.g., in units such as mean time before failure (MTBF). This initial goal is selected by project leaders as the ultimate measure of reliability that is desired for a product. Next, in block 54, "what-if" sensitivity analysis is performed to develop a testing schedule that reconciles both quality and scheduling constraints to the satisfaction of the project leaders. In this analysis, MTBF, confidence level, discrimination ratio and number of units to test variables are preferably developed for use in the product reliability test. The use of such variables in product reliability testing is discussed in greater detail below.

Next, in block 62, different types of possible errors are classified generally into reliability and non-reliability errors. The types of errors will vary greatly depending upon the particular product under test. For example, reliability errors for a computer software product may be limited to runtime errors that cannot be attributed to other failures, e.g., hardware failures, installation errors, etc.

Next, in block 66, stability chart limits are developed for use in ramp up and stability assessment step 70 of FIG. 2. In general, stability assessment is a preliminary stage of testing that is performed prior to conducting the product reliability test to ensure that at least a minimum degree of product stability has been achieved.

The stability assessment process generally verifies that the failure rate per unit is more or less constant, which is a desirable precursor to performing a product reliability test. This process serves to transition the product from ramp up (staging) into the product reliability test so that the standard assumption of constant failure rate (stability) is satisfied.

Constant failure rate and Poisson failure process (hence exponential waiting times between failures) are generally assumed by the preferred product reliability test, and thus this step is preferred to ensure there is no violation of assumptions in the test methodology. From a practical standpoint it gives engineers and test personnel time to discover and minimize any non-reliability problems such as interoperability problems and install problems, and to get the test running correctly.

The limits for the stability chart preferably constitute an upper control limit line which is related to the number of failures/day/unit plus a predetermined number of standard deviations (e.g., three). For example, a suitable upper control limit (UCL) line may be $x = f + 3 \times sqrt(f/n)$, where x is the upper control limit, f is the number of failures/day/unit (e.g., 24 hrs / MTBF), and n is the number of units under test.

Figure 4:
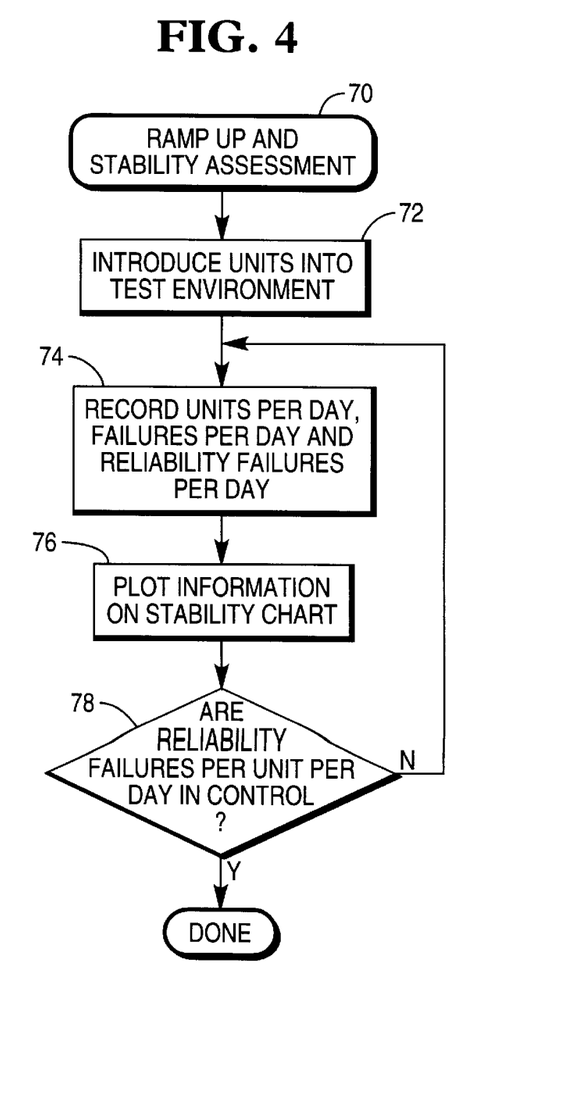
FIG. 4 is a flowchart of the ramp up and stability assessment step of FIG. 2.

The ramp up and stability assessment step is illustrated in greater detail in FIG. 4. First, test units are introduced into the test environment in block 72 to begin the stability assessment. Generally, the test environment for both stability assessment and the product reliability test incorporates subjecting the product to various test conditions that will subject the product to failure. For computer software and hardware products, this may be nothing more than operating the product under normal operating conditions and monitoring failures that occur during the operation thereof.

Next, in block 74, the number of units under test on a given day, the number of failures per day, and the number of reliability related failures per day are recorded (e.g., in a spreadsheet as illustrated in FIG. 7). Next, in block 76, this information is plotted on a stability chart, which preferably takes the form of the chart of FIG. 6 (which corresponds to the data input in the spreadsheet of FIG. 7). Next, if the reliability failures per unit per day on a given day are not yet found to be "in control", testing is performed another day, returning flow to block 74. If the reliability failures are found to be "in control", this stage of the methodology is complete and the product reliability test may be initiated.

For the purposes of the preferred stability assessment, reliability failures are deemed to be "in control" when the reliability failures remain below the UCL line for at least five to seven test periods (days). In more schedule-driven environments, the number of testing periods necessary to establish stability may be lower, and in more quality-driven environments, the number of testing periods may be greater.

Figure 6:
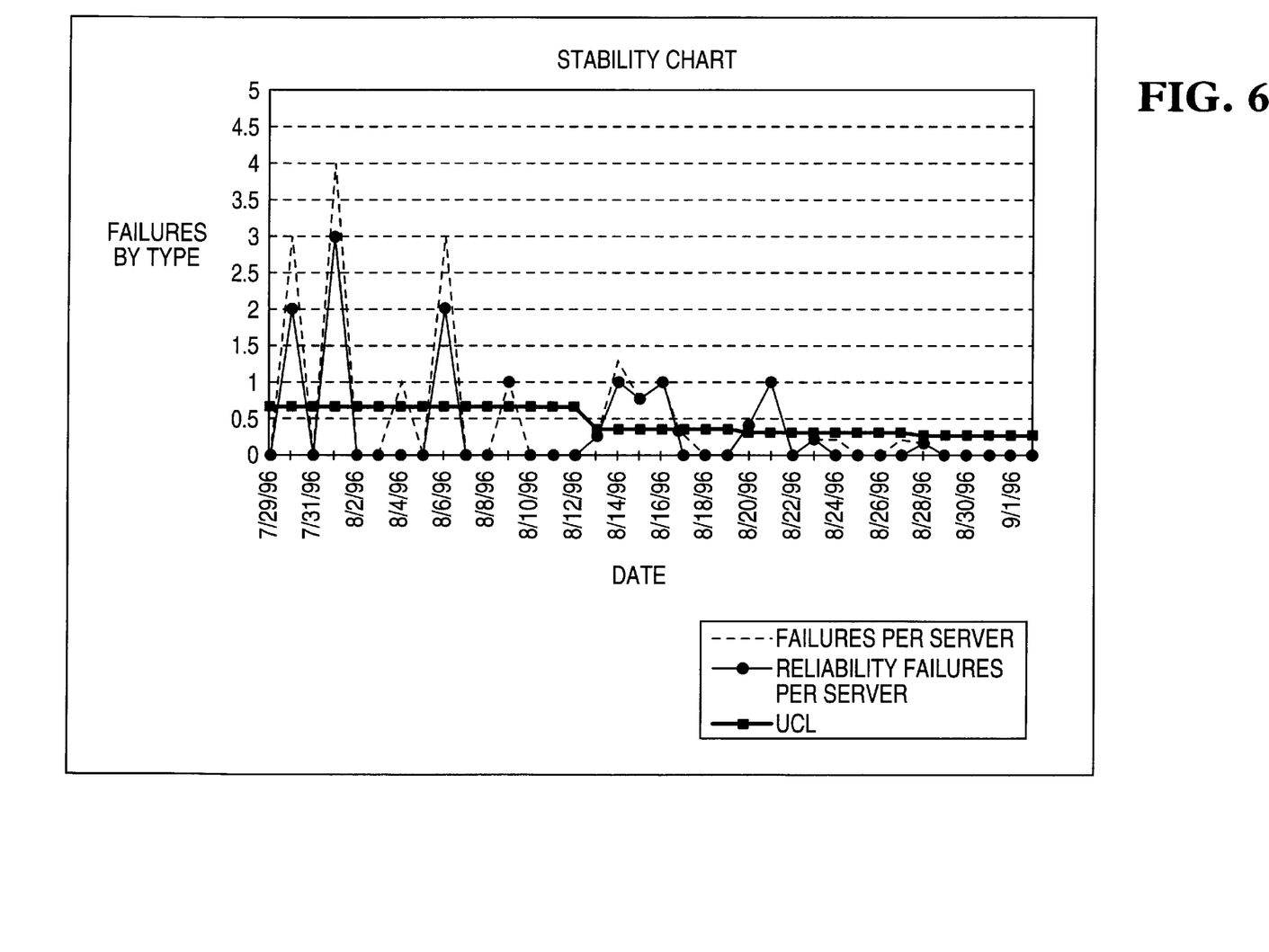
FIG. 6 is an exemplary stability chart used in conjunction with the ramp up and stability assessment step of FIG. 2.

For example, FIG. 6 illustrates a stability chart for the data in FIG. 7, where a MTBF of 672 hrs is the goal. It should be appreciated that dips in the UCL line occur around Aug. 13, 1996 and Aug. 20, 1996 as a result of an increase in the number of units (here, servers running the software) increase. Moreover, the reliability failures become "in control" about Aug. 27, 1996, whereby the product reliability test may then be initiated. In addition, it is possible to utilize the data obtained immediately prior to the failures becoming "in control" (e.g., as of Aug. 22, 1996 in FIG. 6).

After completion of stability testing, the product reliability test 100 is performed. This test is illustrated in greater detail in FIG. 5. In general, during the test data relating to the cumulative runtime and number of failures of the product is accumulated on a daily basis (although other time frames, including hours, weeks, months, etc., may also be used). This data is entered at block 102 into a spreadsheet, e.g., spreadsheet 30 shown in FIG. 7.

Spreadsheet 30 is preferably implemented in a spreadsheet application such as Microsoft Excel. It will be appreciated however that the aspects of the invention may be implemented in other applications, e.g., databases or dedicated computer applications specifically designed to implement these aspects of the invention.

It should also be appreciated that the various calculations and decision logic implemented in the various entries in spreadsheet 30 would be within the skills of the ordinary artisan, and in any event will vary depending upon the particular application utilized to implement the spreadsheet.

Figure 5:
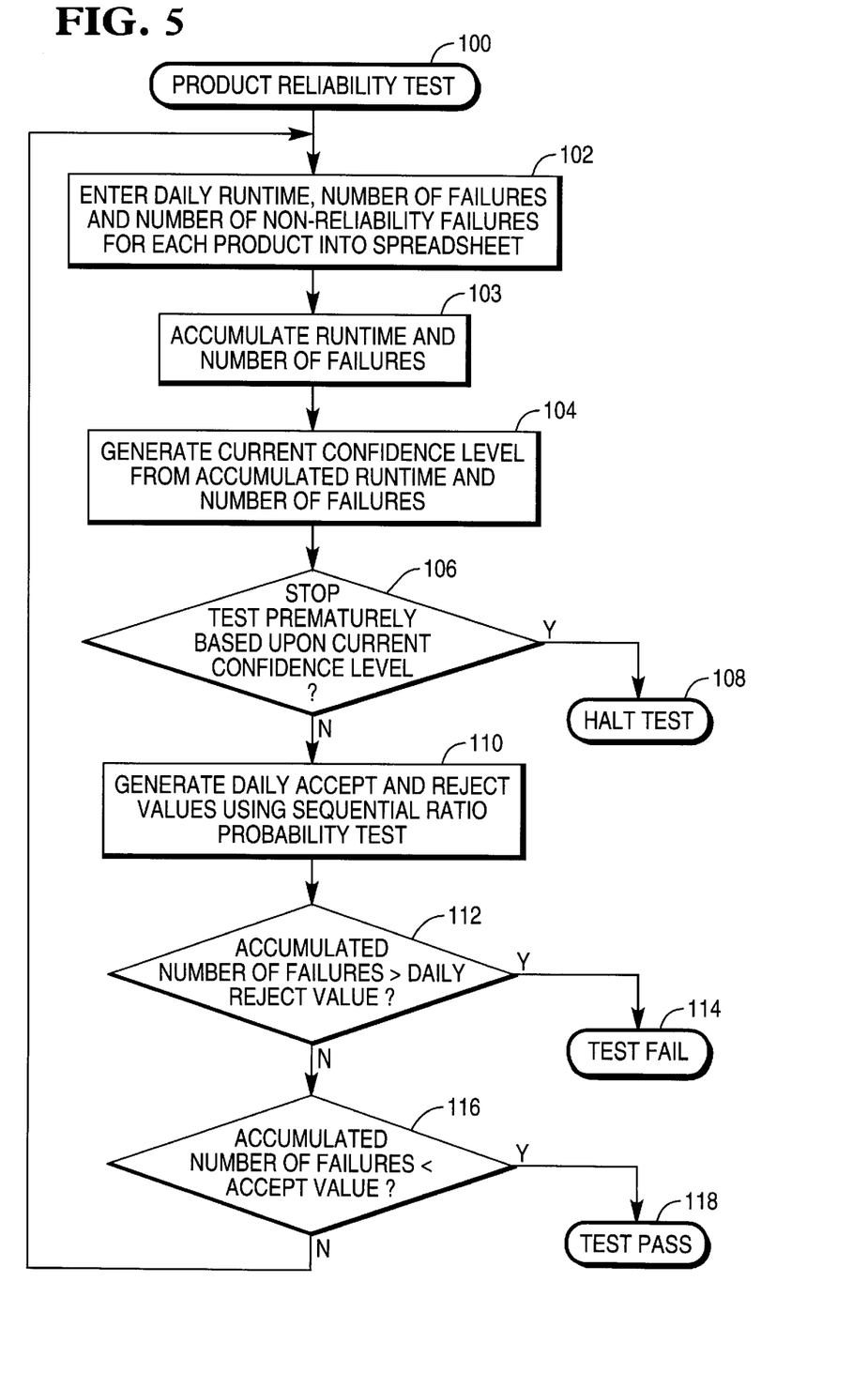
FIG. 5 is a flowchart of the product reliability test step of FIG. 2.

Next, in block 103, the daily runtime and number of failures data is accumulated with the data from prior days in block 103. Next, in block 104, the accumulated runtime and number of failures data is utilized to generate a current confidence level, in a manner which will be discussed in greater detail below.

As discussed above, the current confidence level generated consistent with the invention permits a more data-driven determination of whether a product should be released prior to completion of the product reliability test. Accordingly, in block 106, a management decision is made as to whether to stop the test prematurely based upon the current confidence level. If this decision is made, the test will be halted in block 108.

If, however, the test is not stopped prematurely, daily sequential probability ratio test data is updated in blocks 110–118. In block 110, daily accept and reject values are generated. In block 112, the accumulated number of failures is compared to the daily reject value. If the accumulated number of failures exceeds this value, a test failure condition is indicated in block 114. If the accumulated number of failures is less than the accept value, as tested in block 116, a successful test is indicated in block 118. If the accumulated number of failures fall between these two values, however, the method returns to block 102 for additional testing.

It should be appreciated that various steps in the product readiness assessment methodology, including the product reliability test, are performed by one or more operators in conjunction with a computer system. For example, block 102 necessitates a degree of monitoring of the product under test and recording failures and runtime data. Moreover, data entry is typically performed by an operator, although it is contemplated that this task could be automated in the alternative. Moreover, even with the current confidence level, block 106 is typically at least a partially-subjective management decision that must be made by the operator or management of an organization. As will be discussed below, blocks 103, 104, 110, 112 and 116 are preferably performed using a spreadsheet or other computer-implemented application. Box 108, 114 and 118 represent test results, and it should be appreciated that an operator or management decision as to the confidence level for which a product has met its product reliability goals is typically the determining factor for when a product reliability test is completed.

As discussed above, a spreadsheet application, e.g. as shown in FIG. 7, is preferably used to implement the computer-implemented aspects of the preferred product reliability test. Prior to the test, an operator inputs into the spreadsheet a desired reliability goal (an MTBF of 672 hours for the network operating system software in this example). Other reliability goals, e.g., in terms of SC/M/Y, may be used in the alternative. In addition, a desired confidence level, which is reflective of the desired level of certainty that the product has met the desired reliability goal, is also input. For many reliability tests for computer software, a confidence level of 80% is typically used.

On a daily basis, an operator enters data into columns 1–4 and 8 of the spreadsheet. Column 1 includes the date, and column 2 includes the number of units (in this example, the number of servers) that are being tested on that day. Column 3 includes the number of failures (criticals) for that day summed over all units. Column 4 includes all failures that are not runtime (reliability) related (designation "EXCL."). These failures are preferably not utilized in the determination of the number of failures for the purposes of the product reliability test, but are nonetheless logged and tracked in the spreadsheet.

Column 8 includes the total system downtime (DT) per day over the various units. It is assumed for this example that the software product under test operates 24 hours a day on all servers unless a failure has occurred. In the alternative, a direct input of the total amount of runtime for a given day over the various units of product under test may be used, particularly when the product is tested a variable portion of each day.

A number of values are calculated for each daily entry in the spreadsheet. In columns 5 and 6, the number of failures per server, and the number of reliability failures (total failures less non-reliability failures), are calculated. In column 7, the daily runtime (RT) is calculated to be the number of units (here, servers) in column 2 times 24 hours and less the daily down time (DT) in column 8. The cumulative runtime (CUM RT) is calculated in column 9 by adding the daily runtime in column 7 to the cumulative runtime from the previous day.

Columns 10–12 reflect the sequential probability ratio test, which will be discussed briefly herein.

In column 11, the cumulative number of failures is calculated by adding the daily number of reliability failures calculated in column 6 to the number of failures in column 11 from the previous day. Then, the daily accept and reject values in columns 10 and 12 are calculated using the sequential probability ratio test. The accept and reject values each represent points on accept and reject lines, which are calculated as follows:

$$r_A = a + b \times t \tag{1}$$

$$r_R = c + b \times t \tag{2}$$

where $$a = \frac{\ln\left(\frac{1-CL}{CL}\right)}{\ln(k)} \tag{3}$$

$$b = \frac{\left(\frac{k-1}{M}\right)}{\ln(k)} \tag{4}$$

$$c = \frac{\ln\left(\frac{CL}{1-CL}\right)}{\ln(k)} \tag{5}$$

and where $r_A$ and $r_R$ are respectively the accept and reject values, t is the cumulative runtime, CL is the desired confidence level and k is the discrimination ratio. Several mathematical assumptions are made, namely that failures occur at a constant rate but randomly and haphazardly (formally, according to a Poisson process with parameter= 1/M where M the MTBF to be demonstrated), and that the times between failure are distributed exponentially.

Column 13 includes a decision step which outputs "ACCEPT" if the cumulative failures is less than or equal to the accept value, "REJECT" if the cumulative failures is greater than or equal to the reject value, and "CONTINUE" if the cumulative failures is between the accept and reject values. Therefore, it may be seen from FIG. 7 that after the product reliability test begins on Aug. 22, 1996, column 13 displays "CONTINUE" until Sep. 10, 1996, whereby the cumulative number of failures first falls below the accept value.

Figure 8:
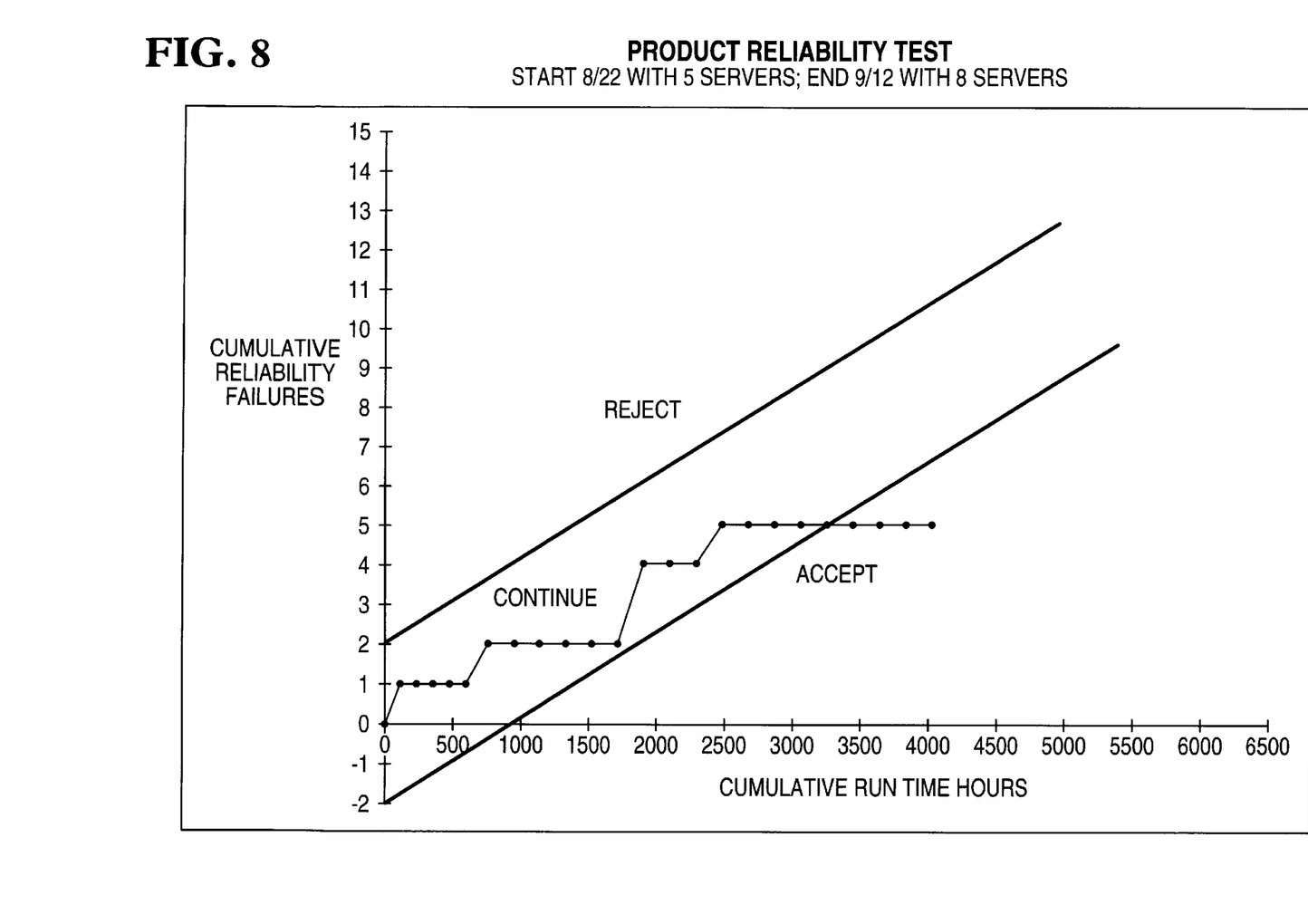
FIG. 8 is a graph of cumulative failures vs. cumulative runtime for the data illustrated in the spreadsheet of FIG. 7.

FIG. 8, for example, illustrates a graph of the data shown in the spreadsheet of FIG. 7 and using a discrimination ratio of 2 (which is a commonly-used value in many industries). This graph may be generated manually, or more preferably using a standard graphing function in the spreadsheet application. As shown by this graph, the accept and reject lines form accept, reject and continue ranges.

Returning to FIG. 7, column 14 is where the current confidence level is generated, which enables the quantified risk assessment of whether a product will ultimately meet a future reliability goal to be performed consistent with the invention. Calculation of the current confidence level is performed using a formula that is derived by determining what the confidence level of the test would be should the accept line be translated up to intersect with the plot of the cumulative number of failures after a given cumulative runtime, and without disturbing or changing the slope of the accept line. Derivation of this formula begins with equation (2) above, which, after substituting the values of a and b from equations (3) and (4) above and substituting r, the cumulative number of failures, for the accept value $r_A$, the following equation is presented.

$$r = \frac{\ln\left(\frac{1-CL}{CL}\right)}{\ln(k)} + \frac{\left(\frac{k-1}{M}\right)}{\ln(k)} \times t \tag{6}$$

Multiplying through by ln(k) and then applying the exponential function "exp" results in the following equation:

$$w = \frac{1-CL}{CL} \tag{7}$$

where $$w = \exp\left[r \times \ln(k) - \left(\frac{k-1}{M}\right) \times t\right] \tag{8}$$

Finally, solving for CL results in the equation:

$$CL = \frac{1}{1+w} \tag{9}$$

Figure 9:
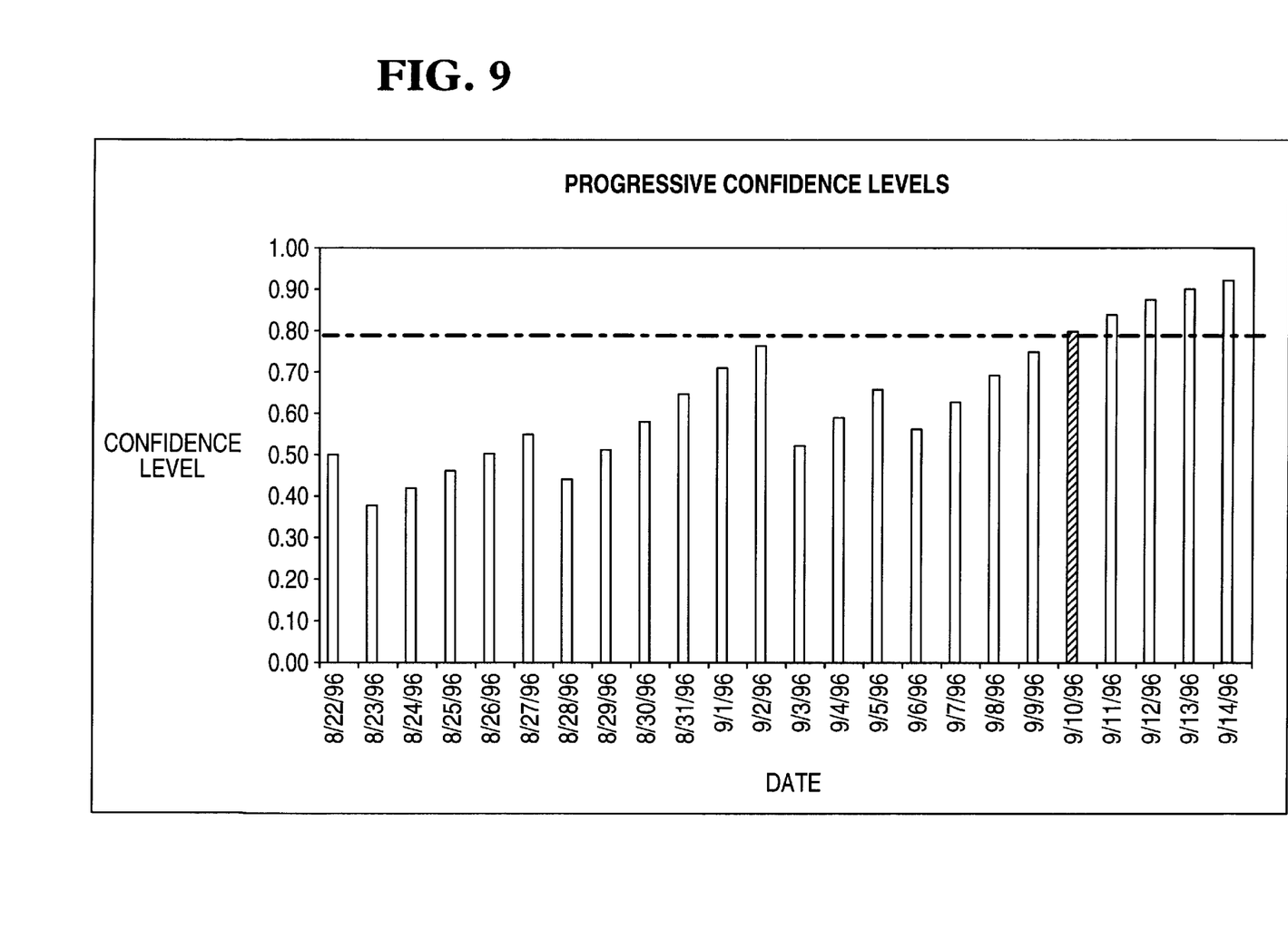
FIG. 9 is a graph of the current confidence level for various dates for the data illustrated in the spreadsheet of FIG. 7.

FIG. 9 illustrates a graph of the current confidence level for the data on several dates in the spreadsheet of FIG. 7.

It will be appreciated that the constants utilized in the above calculations may vary depending upon the product to be tested and the level of reliability required for the particular product. For example, at different stages in the development cycle, different confidence levels may be used, e.g. at the feature audit stage, the customer deployment evaluation stage, or the engineering field trial. Moreover, the discrimination ratio may be varied depending upon how discriminating or powerful the test is to be.

Other features may be added to the preferred spreadsheet. Moreover, the spreadsheet permits "what-if" analysis to be performed, e.g., by changing any of the constant values.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention, and further, various steps may be allocated between an operator and one or more computers.

In summary, the present invention discloses a method, system, and program storage device for dynamically assessing the market readiness of a product under development by generating from accumulated runtime and failure data a current confidence level that is related to a quantified risk assessment of whether the product will ultimately meet a predetermined reliability goal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of dynamically assessing the market readiness of a product under development as represented by a current confidence level, the method comprising the steps of:
   (a) subjecting the product to a product reliability test;
   (b) accumulating a runtime for the product during the product reliability test;
   (c) accumulating a number of failures for the product during the product reliability test;
   (d) storing the accumulated runtime and number of failures on a computer;
   (e) at any time during the product reliability test and prior to the product meeting a predetermined reliability goal, generating with the computer a current confidence level from the accumulated runtime and number of failures, wherein the current confidence level is related to a quantified risk assessment of whether the product will ultimately meet the predetermined reliability goal thereby providing a data-driven determination of whether a product should be released prior to completion of the product reliability test; and
   (f) halting the product reliability test and releasing the product prior to completion of the product reliability test when indicated by the current confidence level.

2. The method of claim 1, wherein the product is a computer software product, and wherein subjecting the product to the product reliability test includes operating the computer software product under normal operating conditions.

3. The method of claim 2, wherein the runtime and number of failures accumulating steps each include the step of summing data accumulated for multiple copies of the computer software product executing on different computers.

4. The method of claim 1, wherein the runtime and number of failures accumulating steps and the generating step are performed using a spreadsheet software application.

5. The method of claim 1, wherein the generating step generates the current confidence level using the equation:

$$CL = \frac{1}{1 + \exp\left[r \times \ln(k) - \left(\frac{k-1}{M}\right) \times t\right]}$$

wherein CL is the current confidence level, r is the accumulated number of failures, t is the accumulated runtime, M is the predetermined reliability goal in units of time over failures, and k is a discrimination ratio.

6. The method of claim 5, wherein the predetermined reliability goal is a mean time before failures value in units of hours per failure.

7. The method of claim 5, further comprising the steps of:
   calculating with the computer accept and reject ranges using a sequential probability ratio test;
   indicating with the computer a successful product test if the accumulated number of failures at a given time is within the calculated accept range; and
   indicating with the computer an unsuccessful product test if the accumulated number of failures at a given time is within the calculated reject range.

8. The method of claim 5, wherein the number of failures accumulating step includes the step of excluding any failures that are not reliability related from the accumulated number of failures.

9. The method of claim 1, further comprising the step of, prior to subjecting the product to the product reliability test, assessing a stability of the product, including the steps of tracking reliability errors on a stability chart, and initiating the product reliability test when reliability errors are in control.

10. The method of claim 1, further comprising the step of, prior to subjecting the product to the product reliability test, selecting the predetermined reliability goal to balance quality and scheduling constraints for the product.

11. A computer-implemented product readiness assessment system for dynamically assessing the market readiness of a product under development as represented by a current confidence level, the system comprising:
   (a) a computer;
   (b) means, performed by the computer, for accumulating a runtime for the product during a product reliability test performed thereon;
   (c) means, performed by the computer, for accumulating a number of failures for the product during the product reliability test;
   (d) means, performed by the computer, for storing the accumulated runtime and number of failures;
   (e) means, performed by the computer, for generating with the computer a current confidence level from the accumulated runtime and number of failures, during the product reliability test and prior to the product meeting a predetermined reliability goal, wherein the current confidence level is related to a quantified risk assessment of whether the product will ultimately meet the predetermined reliability goal thereby providing a data driven determination of whether a product should be released prior to completion of the product reliability test; and
   (f) means, performed by the computer for halting the product reliability test to permit the release of the product prior to completion of the product reliability test when indicated by the current confidence level.

12. The system of claim 11, wherein the product is a computer software product, and wherein the product reliability test comprises operating the computer software product under normal operating conditions.

13. The system of claim 12, wherein the means for accumulating runtime and number of failures each comprise means for summing data from multiple copies of the computer software product executing on different computers.

14. The system of claim 11, wherein the system is implemented in a spreadsheet application.

15. The system of claim 11, wherein the means for generating the current confidence level uses the equation:

$$CL = \frac{1}{1 + \exp\left[r \times \ln(k) - \left(\frac{k-1}{M}\right) \times t\right]}$$

wherein CL is the current confidence level, r is the accumulated number of failures, t is the accumulated runtime, M is the predetermined reliability goal in units of time over failures, and k is a discrimination ratio.

16. The system of claim 15, wherein the predetermined reliability goal is a mean time before failures value in units of hours per failure.

17. The system of claim 15, further comprising:

means, performed by the computer, for calculating accept and reject ranges using a sequential probability ratio test;

means, performed by the computer, for indicating a successful product test if the accumulated number of failures at a given time is within the calculated accept range; and means, performed by the computer, for indicating an unsuccessful product test if the accumulated number of failures at a given time is within the calculated reject range.

18. The system of claim 15, wherein the means for accumulating number of failures excludes any failures that are not reliability related from the accumulated number of failures.

19. A program storage device, readable by a computer and tangibly embodying one or more programs of instructions executable by the computer to perform method steps of dynamically assessing the market readiness of a product under development as represented by a current confidence level, the method comprising the steps of:

(a) accumulating a runtime for the product during a product reliability test performed thereon;

(b) accumulating a number of failures for the product during the product reliability test;

(c) storing the accumulated runtime and number of failures on a computer;

(d) from time to time during the product reliability test and prior to the product meeting a predetermined reliability goal, generating with the computer a current confidence level from the accumulated runtime and number of failures, wherein the current confidence level is related to a quantified risk assessment of whether the product will ultimately meet the predetermined reliability goal, thereby providing a data driven determination of whether a product should be released prior to completion of the product reliability test; and (f) halting the product reliability test to permit the release of the product prior to completion of the product reliability test when indicated by the current confidence level.

20. The program storage device of claim 19, wherein the current confidence level is provided using the equation:

$$CL = \frac{1}{1 + \exp\left[r \times \ln(k) - \left(\frac{k-1}{M}\right) \times t\right]}$$

wherein CL is the current confidence level, r is the accumulated number of failures, t is the accumulated runtime, M is the predetermined reliability goal in units of time over failures, and k is a discrimination ratio.

21. The program storage device of claim 20, wherein the method further comprises the steps of:

calculating with the computer accept and reject ranges using a sequential probability ratio test;

indicating with the computer a successful product test if the accumulated number of failures at a given time is within the calculated accept range; and indicating with the computer an unsuccessful product test if the accumulated number of failures at a given time is within the calculated reject range.

* * * * *